United States Patent
Prasad et al.

(10) Patent No.: US 11,614,824 B2
(45) Date of Patent: Mar. 28, 2023

(54) SYSTEM AND METHOD TO MEASURE LATENCY IN DISPLAYING A KEY TAP EVENT

(71) Applicant: TALENT UNLIMITED ONLINE SERVICES PVT. LTD., Delhi (IN)

(72) Inventors: Rahul Prasad, Gurugram (IN); Ankit Prasad, Gurugram (IN)

(73) Assignee: TALENT UNLIMITED ONLINE SERVICES PVT. LTD.

( * ) Notice: Subject to any disclaimer, the term of this patent is extended or adjusted under 35 U.S.C. 154(b) by 0 days.

(21) Appl. No.: 17/815,967

(22) Filed: Jul. 29, 2022

(65) Prior Publication Data
US 2023/0030505 A1 Feb. 2, 2023

(30) Foreign Application Priority Data
Jul. 29, 2021 (IN) .............................. 202111034047

(51) Int. Cl.
*G06F 3/041* (2006.01)
*G06F 3/04886* (2022.01)

(52) U.S. Cl.
CPC ........ *G06F 3/0416* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 8,441,377 B2 * | 5/2013 | Liu | ........................ | H03M 11/10 345/169 |
| 8,725,443 B2 * | 5/2014 | Uzelac | ................ | G06F 11/2221 702/79 |
| 9,483,176 B2 * | 11/2016 | Xiong | ........................ | G06F 3/14 |
| 2013/0061228 A1 * | 3/2013 | Prasad | ........................ | G06F 8/71 718/100 |
| 2019/0107898 A1 * | 4/2019 | Cancio | ..................... | G06F 3/023 |
| 2019/0294258 A1 * | 9/2019 | Forlines | ................. | G06F 3/0202 |
| 2021/0382610 A1 * | 12/2021 | Prasad | ................ | G06F 3/04817 |

OTHER PUBLICATIONS

Usability Testing of Virtual Keyboard in Touch Screen With Questionnaire Method; Harijanto Pangetsu; CommIT (Communication and Information Technology) Journal 8(1):17; https://www.researchgate.net/publication/305229541_USABILITY_TESTING_OF_VIRTUAL_KEYBOARD_IN_TOUCH_SCREEN_WITH_QUESTIONNAIRE_METHOD.

* cited by examiner

*Primary Examiner* — Stephen T. Reed
(74) *Attorney, Agent, or Firm* — Jason C. Cameron

(57) ABSTRACT

A system to measure latency in displaying a key tap event corresponding to a touchscreen keyboard is disclosed. The system includes a text input module, configured to capture pre-defined text for latency measurement. The system includes a keyboard selection module, configured to select a virtual keyboard for the latency measurement with respect to the pre-defined text. The system includes a keyboard configuration module, configured to capture positional details of each text character of the pre-defined text with respect to registered virtual keyboard. The execution module, configured to execute the key tap event for each of the text character of the pre-defined text for latency measurement, to measure time gap of each text character of the pre-defined text between the key tap event and corresponding text display event and also configured to calculate average latency measurement of the pre-defined text from a measured time gap for each of the character.

16 Claims, 18 Drawing Sheets

Perform Keypress Lag — START

Keypress Lag: 258 ms — 284

Perform Keypress Lag Delete — START

Line 32:/: React Hook useeffect has a missing dependency: 'handleData'. Either include it or remove the dependency array react-hooks/exhaustive-deps
⚠ webpackHotDevClient.js:138

./src/components_new/pages/monkeyCrashAnr.jsx
Line 32:7: React Hook useEffect has a missing dependency: 'context.selDevice'. Either include it or remove the dependency array react-hooks/exhaustive-deps
Line 102:17: 'x' is assigned a value but never used no-unused-vars ⚠ There were more warnings in other files.   webpackHotDevClient.js:132
You can find a complete log in the terminal.

keypressLag.jsx:179
{data1: " ", data2: " {1603866759407}" , data3: " " , data4: " {1603866759582}" , data5: " {} " , _}

| | |
|---|---|
| input tap 43 1968 | adb.js:275 |
| input tap 641 1846 | adb.js:275 |
| input tap 43 1968 | adb.js:275 |
| input tap 269 1677 | adb.js:275 |
| input tap 43 1968 | adb.js:275 |
| input tap 968 1839 | adb.js:275 |
| input tap 43 1968 | adb.js:275 |
| input tap 968 1839 | adb.js:275 |
| input tap 908 1675 | adb.js:275 |

SYSTEM AND METHOD TO MEASURE LATENCY IN DISPLAYING A KEY TAP EVENT

CROSS-REFERENCE TO RELATED APPLICATIONS

This Application claims priority from a patent application filed in India having Patent Application No. 202111034047 filed on Jul. 29, 2021 and titled "SYSTEM AND METHOD TO MEASURE LATENCY IN DISPLAYING A KEY TAP EVENT".

FIELD OF INVENTION

Embodiments of a present disclosure relates to a virtual keyboard application, and more particularly to a system and a method to measure latency in displaying a key tap event corresponding to a touchscreen device.

BACKGROUND

As personal mobile devices, such as mobile phones, tablets and laptops became popular, touchscreen devices side by side also became popular. Moreover, touchscreens are also being used in cars and kiosks to allow fast, intuitive, or accurate interaction by the user with any display enabled content.

For functioning, touchscreen devices senses user's fingers or hand gestures in close proximity to the touchscreen. Touchscreens often employ virtual keyboards (or soft keyboards), which have virtual keys that are represented as specific areas of the touchscreen, rather than physical keys. Here, a user touches a virtual key on a touchscreen, the touchscreen system detects the touch and then signals the system processor. Thereby, the system processor inputs the virtual key.

However, because the system processor also manages the other processes of the device (e.g., running the device's operating system and many other applications), response time required to input the virtual key may be slow. In conventional virtual keyboard there is always a noticeable lag between the time the user touches a key and the time that a visual feedback to the key press is provided to the user.

Such time lag hampers the performance of the keyboard associated with the touchscreen device and other applications dependent on the keyboard inputs. In some scenarios early detection of the time lag may also help in understanding the condition of the touchscreen system processor. Time lag value may also provide a benchmark for selecting a third-party virtual keyboard for usage.

Hence, there is a need for a system to measure latency in displaying a key tap event corresponding to a touchscreen device and a method to operate the same and therefore address the aforementioned issues.

BRIEF DESCRIPTION

In accordance with one embodiment of the disclosure, a system to measure latency in displaying a key tap event corresponding to a touchscreen keyboard is disclosed. The system includes a text input module operable by one or more processors. The text input module is configured to capture pre-defined text for latency measurement. The system also includes a keyboard selection module operable by the one or more processors. The keyboard selection module is operatively coupled to the text input module. The keyboard selection module is configured to select a virtual keyboard for the latency measurement with respect to the pre-defined text.

The system also includes a keyboard configuration module operable by the one or more processors. The keyboard configuration module is operatively coupled to the keyboard selection module. The keyboard configuration module is configured to capture positional details of each text character of the pre-defined text with respect to registered virtual keyboard. The execution module operable by the one or more processors. The execution module is operatively coupled to the keyboard configuration module. The execution module is configured to execute the key tap event for each of the text character of the pre-defined text for latency measurement. The execution module is also configured to measure time gap of each text character of the pre-defined text between the key tap event and corresponding text display event. The execution module is also configured to calculate average latency measurement of the pre-defined text from a measured time gap for each of the character.

In accordance with one embodiment of the disclosure, a method for measuring latency in displaying a key tap event corresponding to a touchscreen keyboard is disclosed. The method also includes capturing pre-defined text for latency measurement. The method also includes selecting a virtual keyboard for the latency measurement with respect to the pre-defined text. The method also includes capturing positional details of each text character of the pre-defined text with respect to registered virtual keyboard.

The method also includes executing the key tap event for each of the text character of the pre-defined text for latency measurement. The method also includes measuring time gap of each text character of the pre-defined text between the key tap event and corresponding text display event. The method also includes calculating average latency measurement of the pre-defined text from a measured time gap for each of the character.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
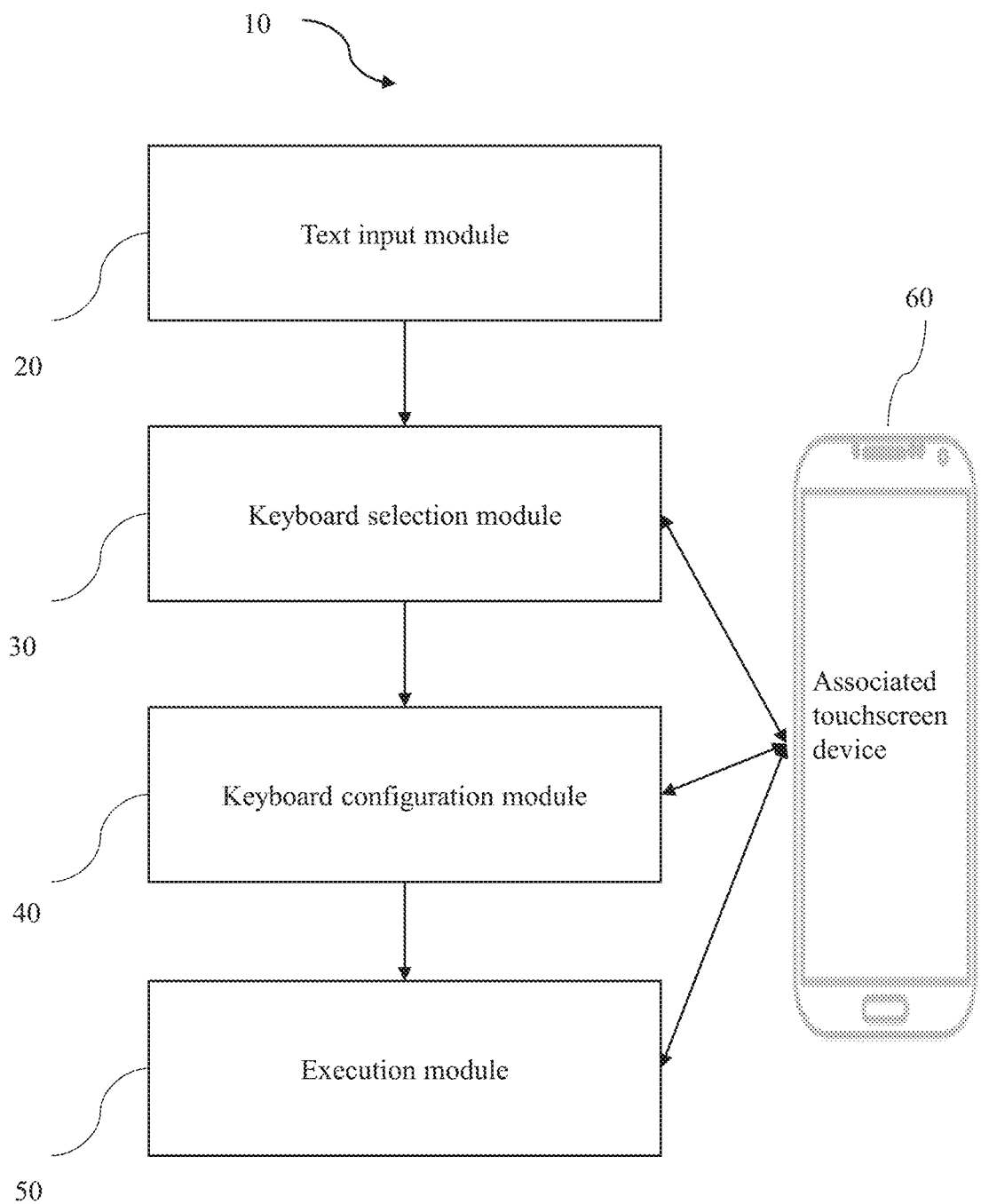
FIG. 1 is a block diagram representation of a system to measure latency in displaying a key tap event corresponding to a touchscreen keyboard in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood. that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises... a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system to measure latency in displaying a key tap event corresponding to a touchscreen keyboard. The system basically checks time lag for any text input tap event and text display event. Via a text input module, the system captures a pre-defined text for latency measurement. The system with the help of a keyboard selection module, selects a virtual keyboard for the latency measurement with respect to the pre-defined text.

The system also includes a keyboard configuration module operable by the one or more processors. Here, the keyboard configuration module is configured to capture positional details of each text character of the pre-defined text with respect to registered virtual keyboard. The positional details include X-coordinate and Y-coordinate details.

The execution module is operatively coupled to the keyboard configuration module. The execution module is configured to execute the key tap event for each of the text character of the pre-defined text for latency measurement. The execution module basically measures time gap of each text character of the pre-defined text between the key tap event and corresponding text display event.

A computer system configured by an application may constitute a "module" that is configured and operated to perform certain operations. In one embodiment, the "module" may be implemented mechanically or electronically, so a module may comprise dedicated circuitry or logic that is permanently configured (within a special-purpose processor) to perform certain operations. In another embodiment, a "module" may also comprise programmable logic or circuitry (as encompassed within a general-purpose processor or other programmable processor) that is temporarily configured by software to perform certain operations.

Accordingly, the term "module" should be understood to encompass a tangible entity, be that an entity that is physically constructed permanently configured (hardwired) or temporarily configured (programmed) to operate in a certain manner and/or to perform certain operations described herein.

FIG. 1 is a block diagram representation of a system 10 to measure latency in displaying a key tap event corresponding to a touchscreen keyboard in accordance with an embodiment of the present disclosure. The system 10 basically measures the time gap between the key tap event of the touchscreen device 60 keypad and key display event. Such time lag details clearly demonstrate keypad efficiency and associated accuracy of the key tap event. Lower the time lag greater the efficiency.

The system 10 includes a touchscreen device registration module operable by one or more processors. The touchscreen device registration module is configured to register one or more touchscreen devices 60 for latency measurement. In such embodiment, for registration of each of the one or more touchscreen devices 60 configuration details are stored at a system storage 300. In one specific embodiment, configuration details refer to setup details of the touchscreen device 60 with hardware and software features that needed to make touchscreen device 60 operate correctly.

In one exemplary embodiment, for measuring latency of specific virtual keyboards associated with a touchscreen device 60, the system 10 should at first register the touchscreen device 10 with configuration details that are essential for measuring latency. Here, specific virtual keyboards comprise Gboard keyboard, SwifiKey, Fleksy keyboard and the like. The system 10 stores the touchscreen devices 60 as connected. Further the system also enables an event of add device, remove device or change device. In such embodiment, the system 10 further provides real time notification whether the touchscreen device 60 is registered or not. The notification may be a text notification and the like.

The system 10 also includes a text input module 20 operable by the one or more processors. The text input module 20 is configured to capture pre-defined text for latency measurement. In one embodiment, the pre-defined text comprises manual input text file or a copied text file. It is pertinent to note that the input text is being used as an analysing parameter for understanding the latency measurement.

Figure 2:
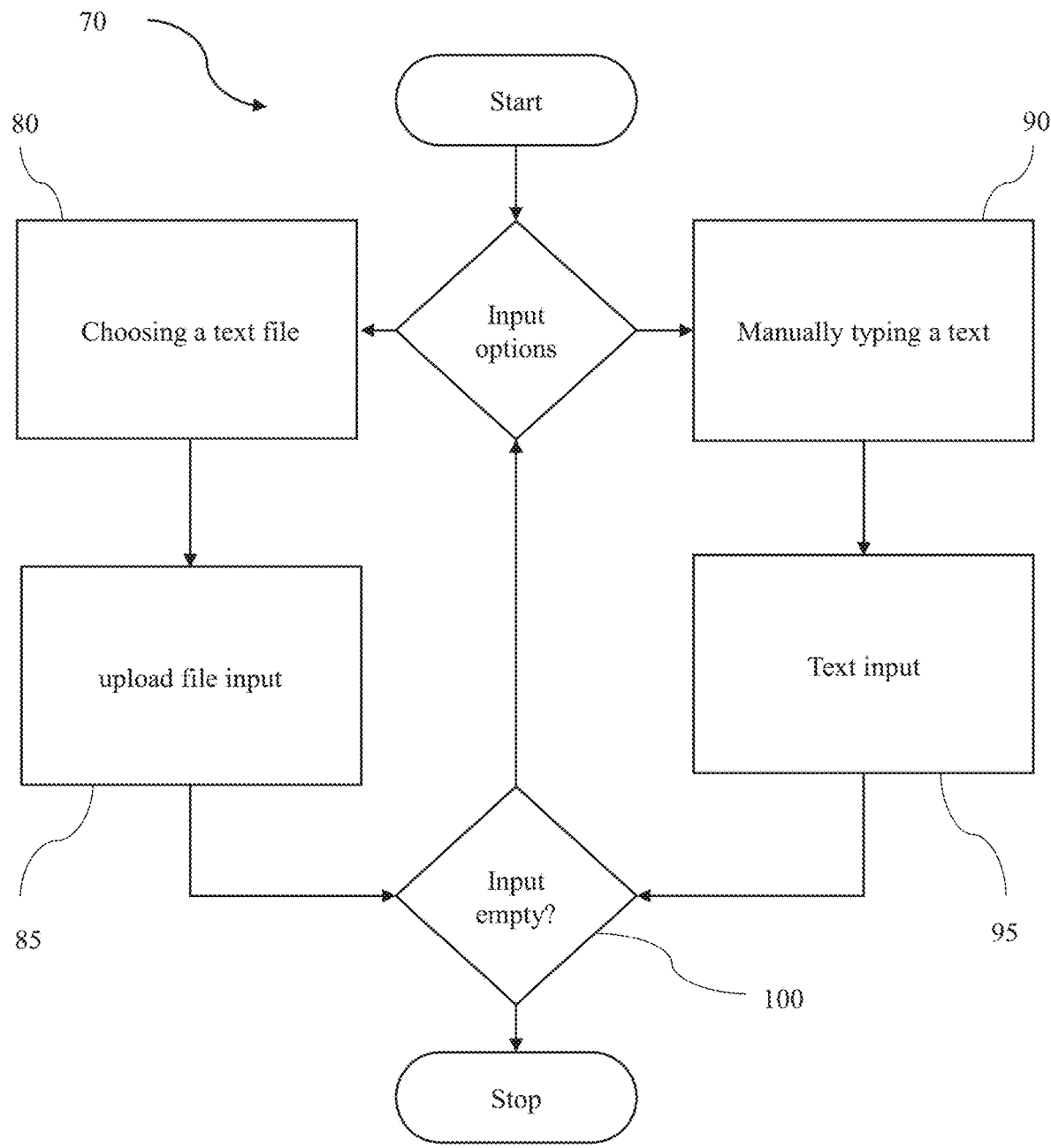
FIG. 2 is a flowchart representation of an embodiment representing steps employed by the text input module of FIG. 1 in accordance with an embodiment of the present disclosure.

FIG. 2 is a flowchart representation of an embodiment representing steps 70 employed by the text input module 20 of FIG. 1 in accordance with an embodiment of the present disclosure. A user is given option to input text in step 80 & 90. The text may be input by typing in step 90 or uploading a text file input in step 80. Accordingly, the user may type the text in step 95 or upload the text file in step 85. It is pertinent to note that if the input entry is empty 100, the text input module 20 loops back to input options box in step 80 & 90. In such embodiment, the system 10 may automatically provide text input facility on detecting "empty" text box.

Figure 3:
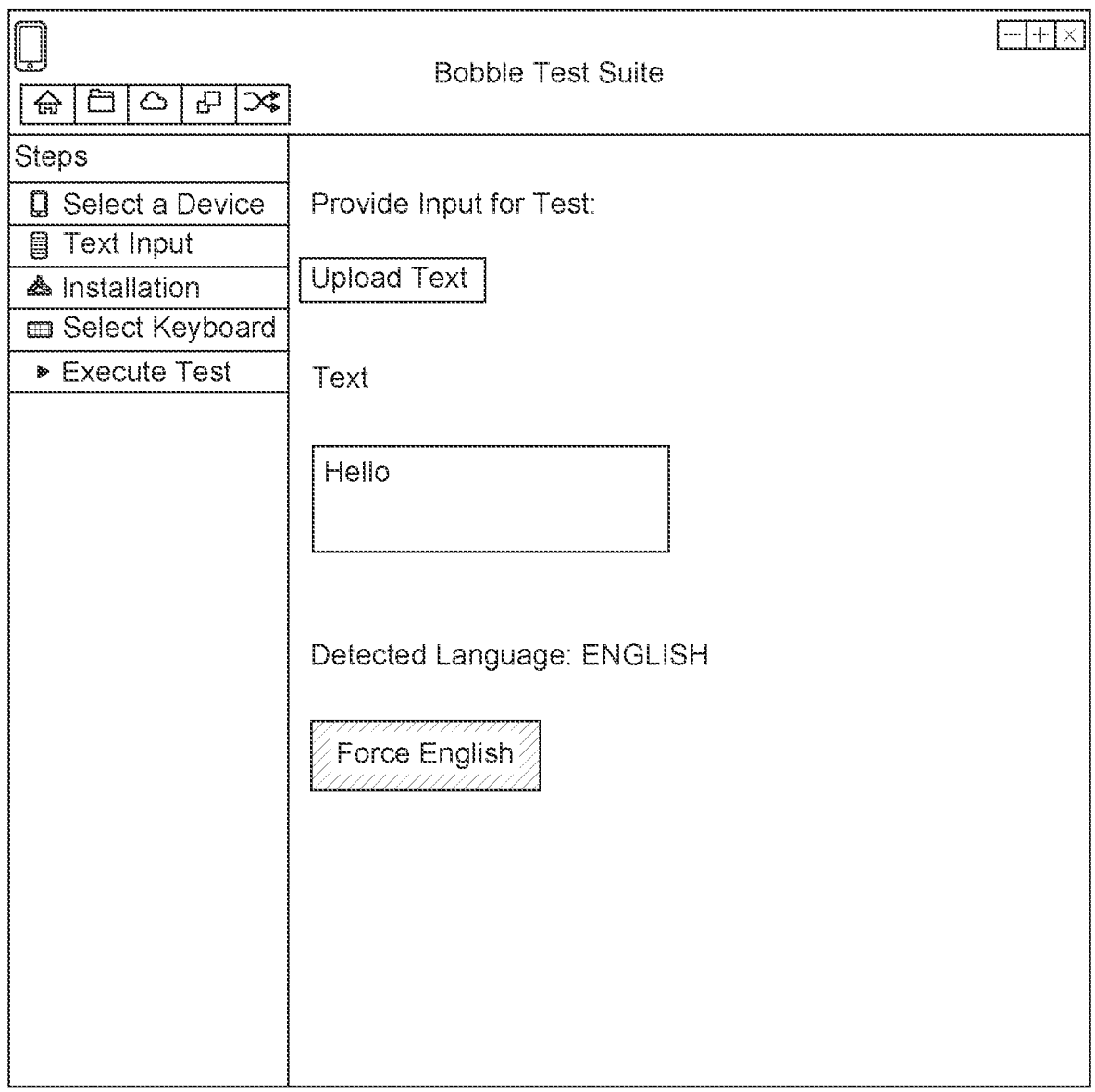
FIG. 3 is a schematic representation of an embodiment representing the text input window of FIG. 1 in accordance with an embodiment of the present disclosure.

FIG. 3 is a schematic representation of an embodiment representing the text input window 110 of FIG. 1 in accordance with an embodiment of the present disclosure. The window 110 enables text input facility for any user of any touchscreen device measuring latency. In one embodiment, the system 10 is easily able to measure latency of virtual keypad irrespective of language constraints. The input text module 20 enables text input only after touch screen registration.

The system 10 also includes a keyboard selection module 30 operable by the one or more processors. The keyboard selection module 30 is operatively coupled to the text input module 20. The keyboard selection module 30 is configured to select a virtual keyboard or virtual keypad for the latency measurement with respect to the pre-defined text. Here, specific virtual keyboards comprise Gboard keyboard, SwifiKey, Fleksy keyboard, bobble keyboard and the like.

Figure 4:
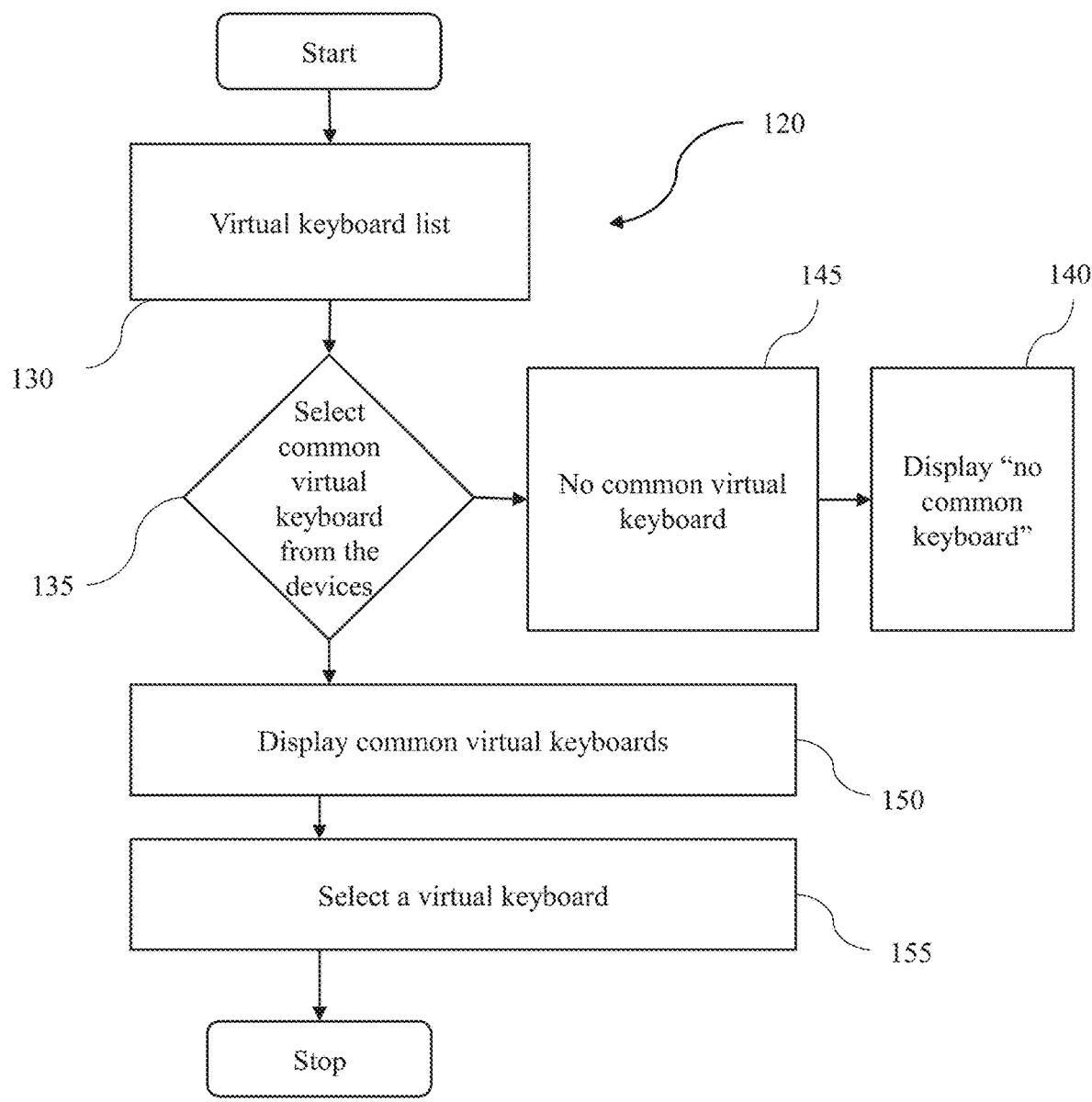
FIG. 4 is a flowchart representation of an embodiment representing steps employed by the keyboard selection module of FIG. 1 in accordance with an embodiment of the present disclosure.

FIG. 4 is a flowchart representation of an embodiment representing steps 120 employed by the keyboard selection module 30 of FIG. 1 in accordance with an embodiment of the present disclosure. The flowchart provides easy steps for selecting virtual keyboards for latency check according to need. The system 10 provides a set of virtual keyboard list in step 130. Further, the user may decide to select any virtual keyboard from the list in step 135.

In one instance, if there are no common virtual keyboard available in the list as shown in step 145, the keyboard selection module 30 may display notification such as "no common keyboard" as stated in step 140. In another instance, after display of common virtual keyboards as shown in step 150, the user in step 155 may select required virtual keyboard. The selected virtual keyboard may be configured or not configured.

Figure 5:
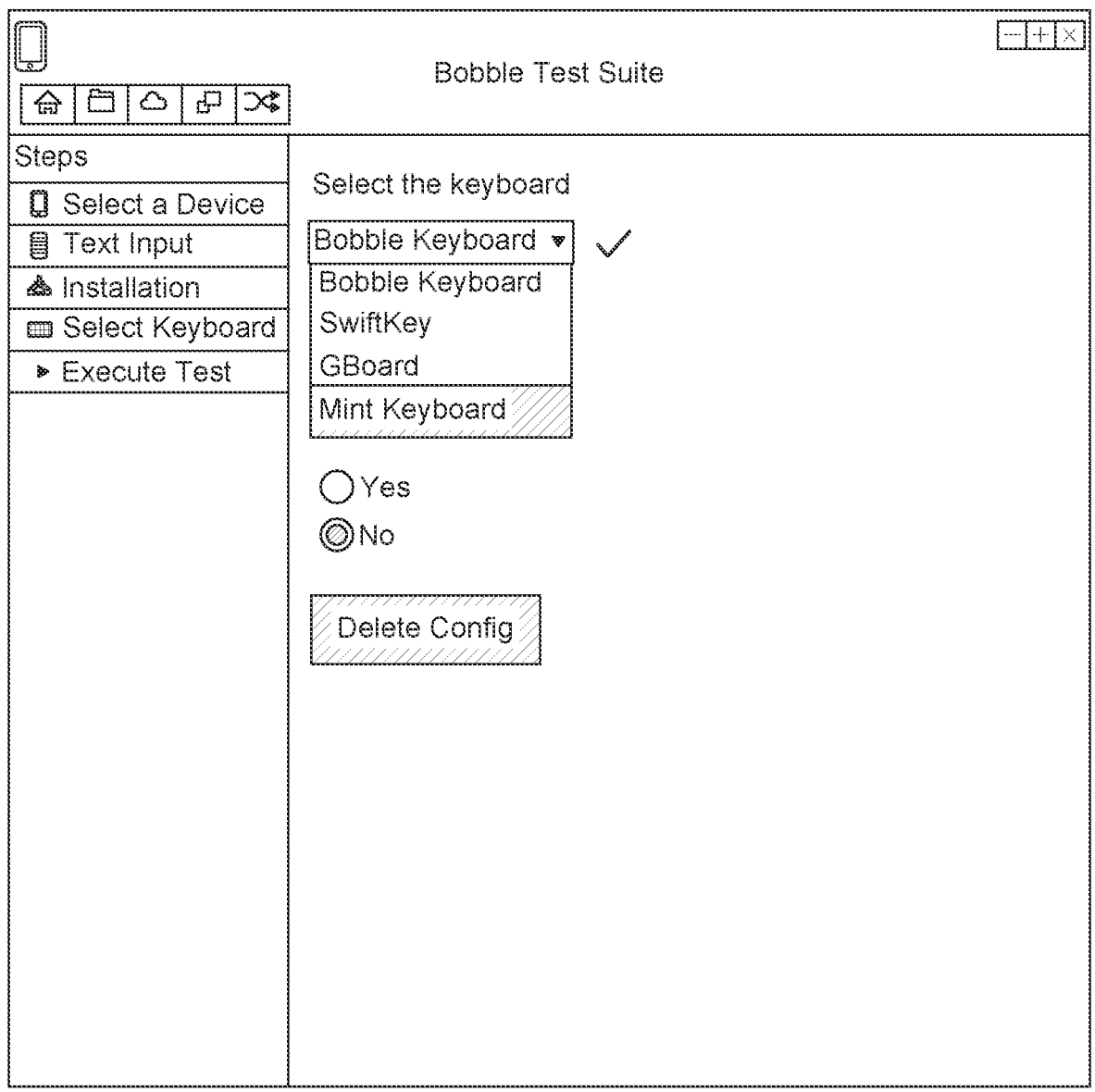
FIG. 5 is a schematic representation of an embodiment representing the keyboard selection window of FIG. 1 in accordance with an embodiment of the present disclosure.

FIG. 5 is a schematic representation of an embodiment representing the keyboard selection window 160 of FIG. 1 in accordance with an embodiment of the present disclosure. Here, the list of virtual keyboards is shown to be available in a dropdown menu. Specifically, for latency measurement beforehand the keypad must be configured with the system 10. The keyboard selection module 30 may store both configured and non-configured virtual keyboard list. The non-configured virtual keyboard is configured by the keyboard configuration module 40.

The system 10 also includes a keyboard configuration module 40 operable by the one or more processors. The keyboard configuration module 40 is operatively coupled to the keyboard selection module 30. The keyboard configuration module 40 is configured to capture positional details of each text character of the pre-defined text with respect to registered virtual keyboard. It is pertinent to capture positional details for each character as different virtual keypad has different position for same character on the keypad. In one embodiment, the text character positional details comprise X-coordinate location and Y-coordinate location. A storage module is configured to store text character positional details with respect to registered virtual keyboard.

Figure 6:
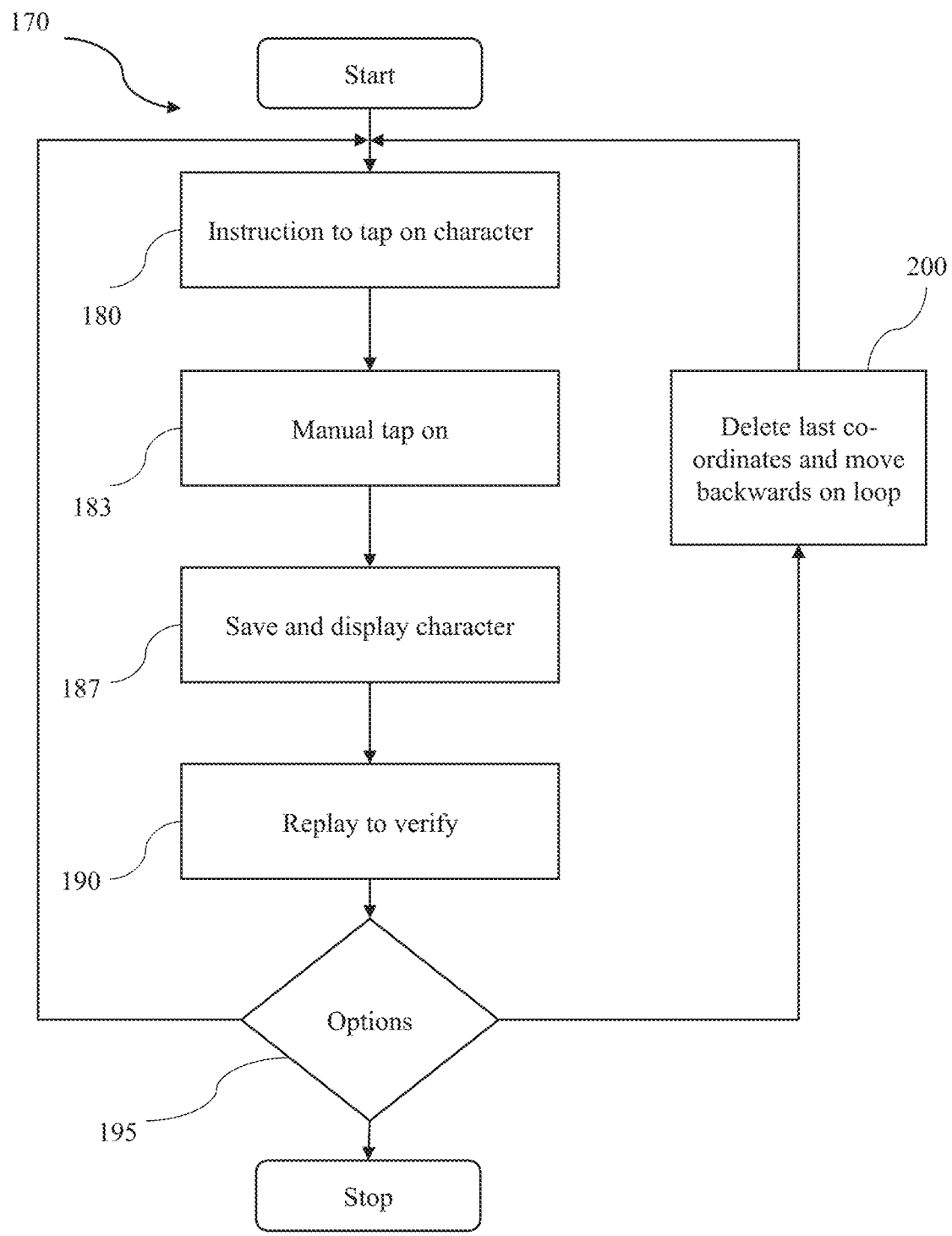
FIG. 6a is a flowchart representation of an embodiment representing steps employed by the keyboard configuration module of FIG. 1 in accordance with an embodiment of the present disclosure.
FIG. 6b is a flowchart representation of an embodiment representing steps employed by a configuration module for auto detection of configuration details of new device FIG. 1 in accordance with an embodiment of the present disclosure.
Figure 6:
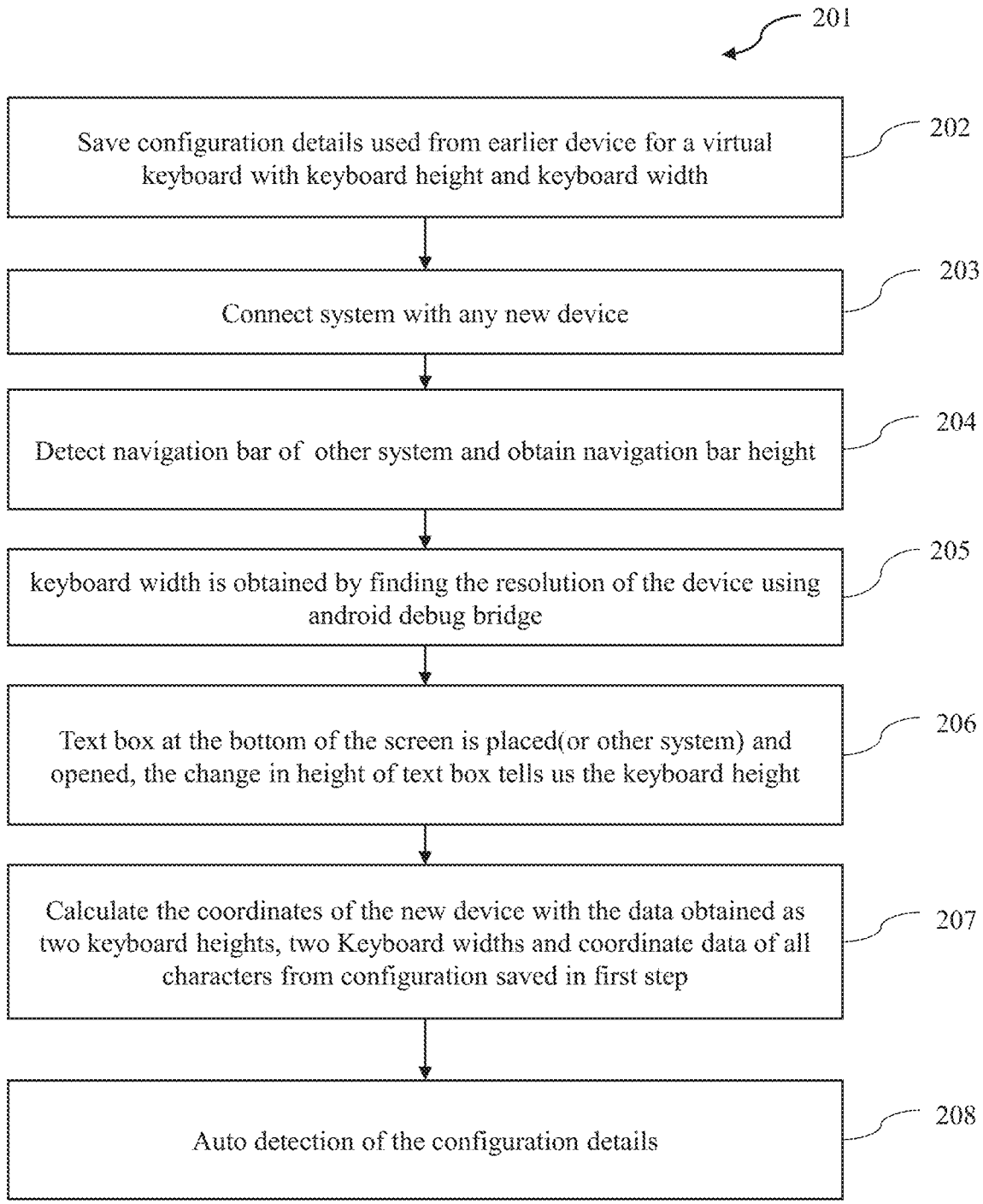

FIG. 6a is a flowchart representation of an embodiment representing steps 170 employed by the keyboard configuration module 40 of FIG. 1 in accordance with an embodiment of the present disclosure. For configuration, the system 10 instructs manual tapping of each character as shown in step 180. The system 10 receives manual tap on as shown in step 183.

For configuration, first the system 10 display's character in step 187 corresponding to the virtual keyboard. In such embodiment, the keyboard configuration module 40 also facilitates replaying of the character as it is configured for accuracy in step 190. The X-coordinate location and the Y-coordinate location are measured. After such configuration details are captured, the system 10 provides notification to the touchscreen device 60 user that the configuration is complete, and the system 10 is ready for latency test. It is pertinent to note that in case the user wants to configure the virtual keyboard again, the system 10 provides option for deletion of coordinates and re-doing the whole process in step 200.

Furthermore, the configuration may be made device independent according to the need. The keyboard configuration module 40 uses the configuration obtained on one device to obtain the configuration of another device. The system 10 achieves device independence once the coordinates of all the characters are captured for a given virtual keyboard on any device.

FIG. 6b is a flowchart representation of an embodiment representing steps 201 employed by the keyboard configuration module 40 for auto detection of configuration details of new device FIG. 1 in accordance with an embodiment of the present disclosure. The keyboard configuration module 40 is also configured to enable auto-configuration of the virtual keyboards by a set of pre-determined steps. The keyboard configuration module 40 at first, saves the captured details for a virtual keyboard with details such as keyboard height and keyboard width at step 202. After such details are saved, the system 10 will auto detect configuration for any new device.

A new device is connected at step 203. To understand the configuration details, first have to eliminate the height of the navigation bar of the new device keyboard. So, at step 204, the navigation bar is detected, and navigation bar height is obtained. The keyboard width is obtained by finding the resolution of the device using android debug bridge at step 205. Afterwards such the change in height of text box when placed bottom gives us the height of the keyboard at step 206.

Then, the keyboard configuration module 40 calculates at step 207, the coordinates of the other new device with the data obtained as two keyboard heights, two Keyboard widths and coordinate data of all characters from configuration saved in first step. From, such calculation, the system auto detects the configuration details of the new device at step 208. The pre-determined steps regarding automatic configuration of the virtual keyboard's is provided in description of FIG. 14a, b and c.

Figure 7:
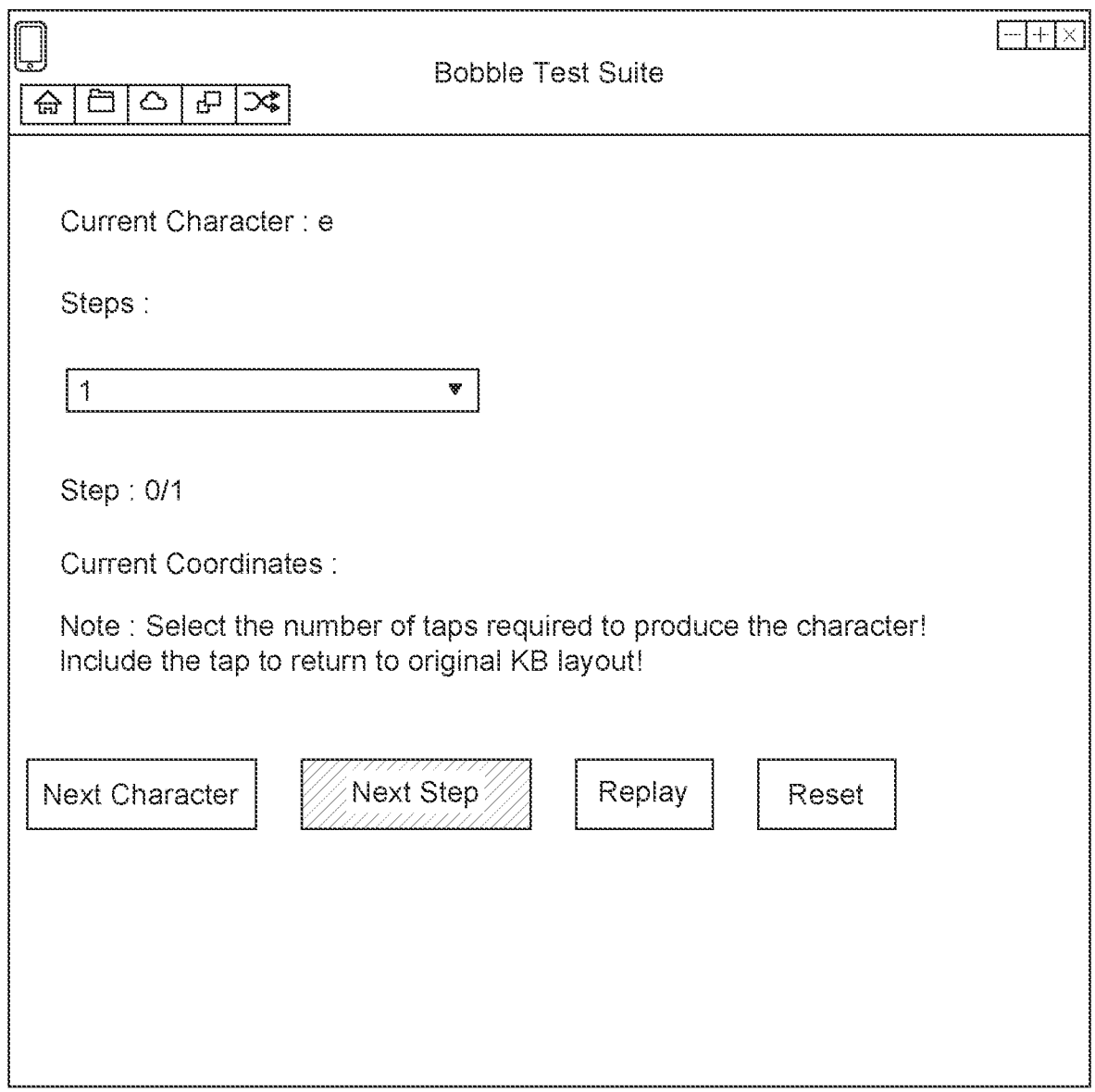
FIG. 7 is a schematic representation of an embodiment representing the keyboard configuration window of FIG. 1 in accordance with an embodiment of the present disclosure.

FIG. 7 is a schematic representation of an embodiment representing the keyboard configuration window 210 of FIG. 1 in accordance with an embodiment of the present disclosure. The configuration may be done for each character or the character present in the text input file as needed. The configuration process enables reset of the positional details via a "reset" button. The configuration process enables rechecking of the positional details via a "replay" button. (as shown in FIG. 7)

The system 10 also includes an execution module 50 operable by the one or more processors. The execution module 50 is operatively coupled to the keyboard configuration module 40. The execution module 50 is configured to execute the key tap event for each of the text character of the pre-defined text for latency measurement. In one embodiment, the key tap event corresponding to the pre-defined text is automatically processed with the registered virtual keyboard after configuration.

In such embodiment, for automatically processing the key tap event corresponding to the pre-defined text, the execution module 50 is configured to identify each character of the pre-defined text. And further, the execution module 50 is also configured to execute key tapping event with respect to registered virtual keyboard for the identified character. It is pertinent to note that each character of the string of characters is entered one by one. And each character is processed one by one for checking time lag.

The execution module 50 is also configured to measure time gap of each text character of the pre-defined text between the key tap event and corresponding text display event. The execution module 50 is also configured to calculate average latency measurement of the pre-defined text from a measured time gap for each of the character. Here, a presentation module is configured to present average latency measurement of the pre-defined text to a touchscreen device 60 user.

Figure 8:
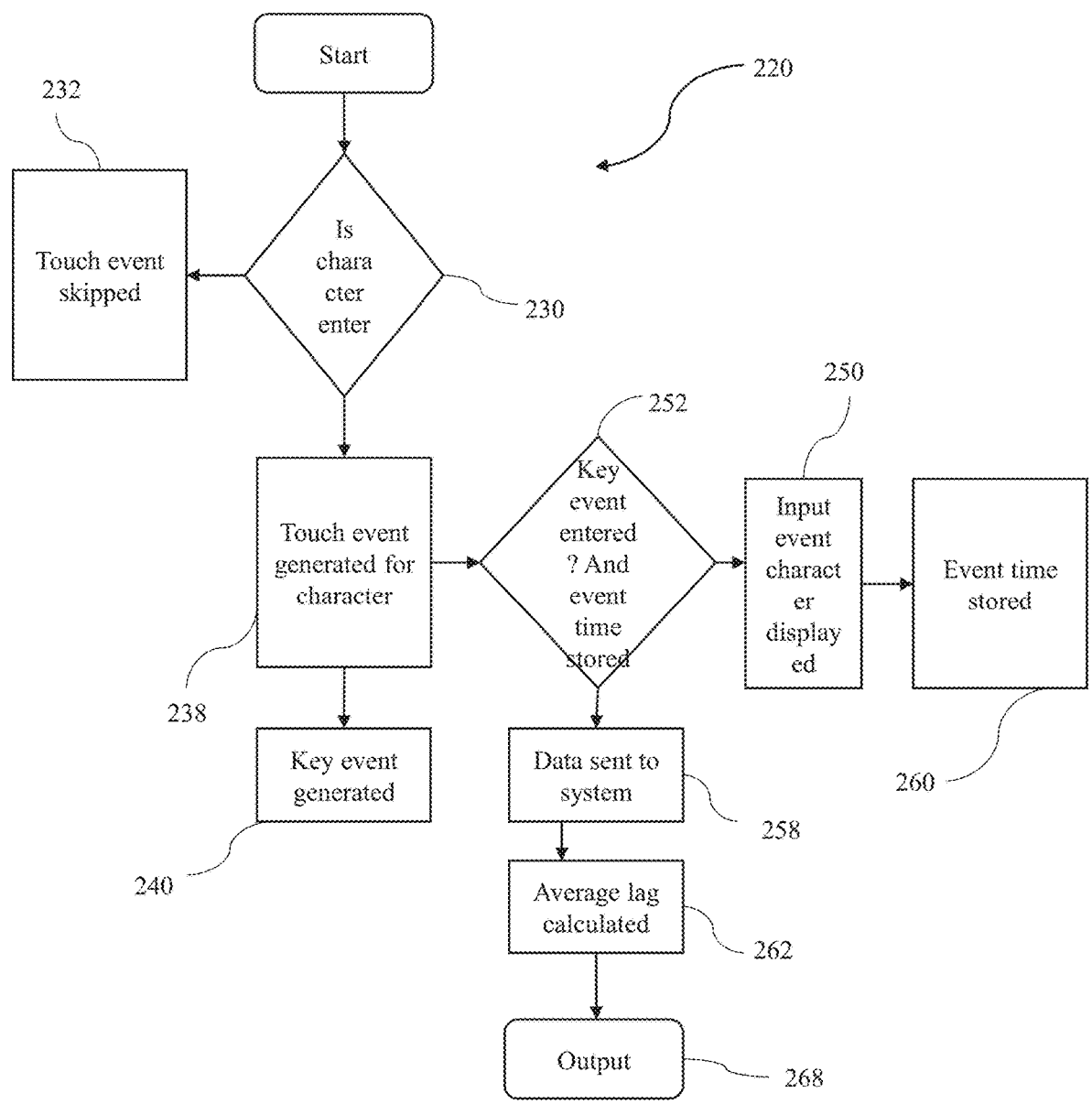
FIG. 8 is a flowchart representation of an embodiment representing steps employed by the execution module of FIG. 1 in accordance with an embodiment of the present disclosure.

FIG. 8 is a flowchart representation of an embodiment representing steps 220 employed by the execution module 50 of FIG. 1 in accordance with an embodiment of the present disclosure. For execution, each character of the input file is entered in step 230 and processed one by one automatically. In first instance of execution, the touch event may be skipped in step 232 or generated in step 238. After key event generated, the latency process is carried ahead.

For calculation, time duration is measured for each character as the key is tapped in step 240 and the character is the displayed in step 250. Event time duration as measured in step 250 is stored in step 260 along with character display 252 time. Lastly, the average time lag is calculated in step 262. The average lag is displayed as output in step 268 for user view. The calculated and measured time lag is sent for storage in step 268.

Figure 9:
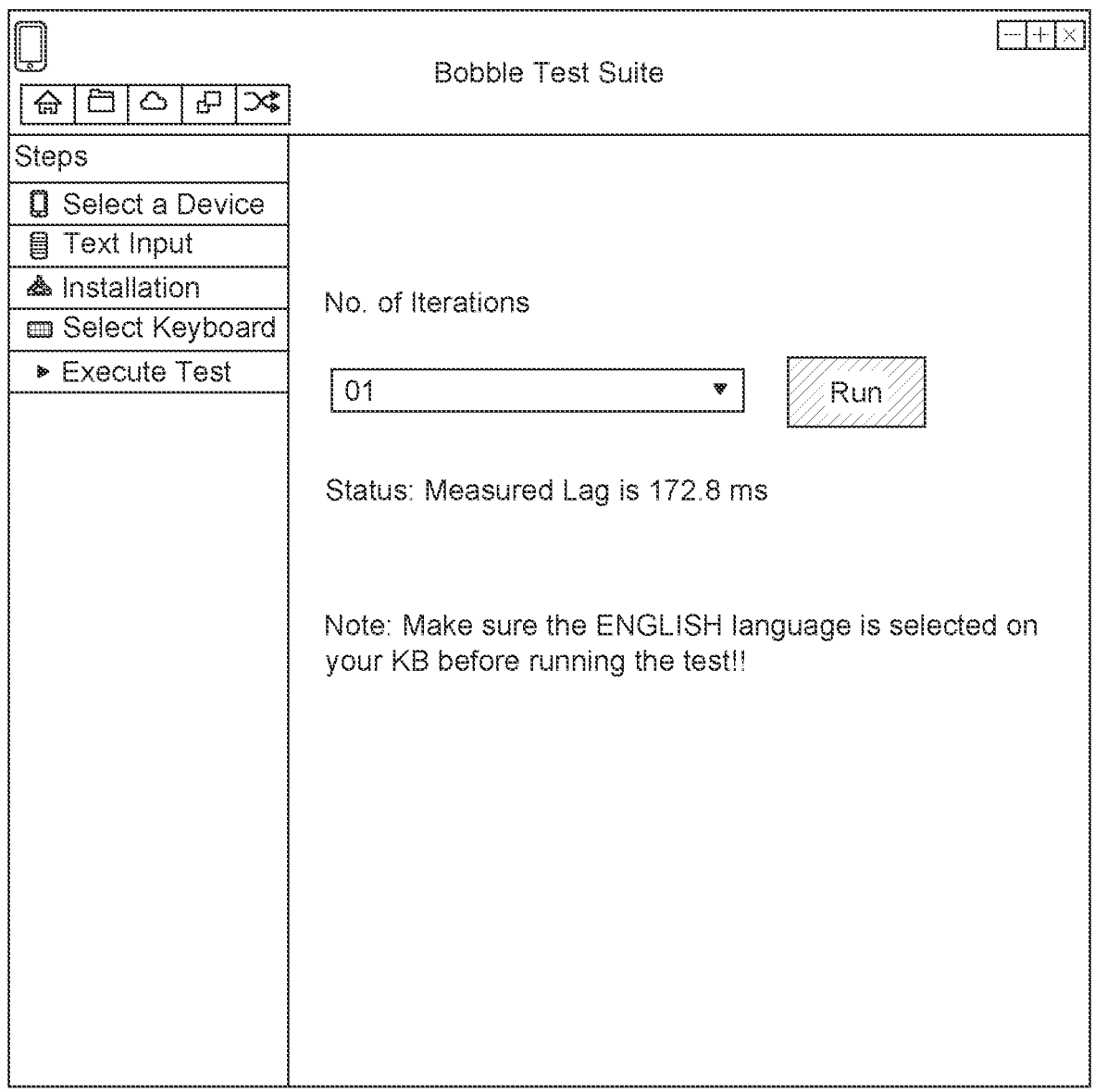
FIG. 9 is a schematic representation of an embodiment representing the execution window of FIG. 1 in accordance with an embodiment of the present disclosure.

FIG. 9 is a schematic representation of an embodiment representing the execution window 270 of FIG. 1 in accordance with an embodiment of the present disclosure. The window 270 shows the number of iterations is attempted to check the time lag for any particular character string or character.

Figure 10:
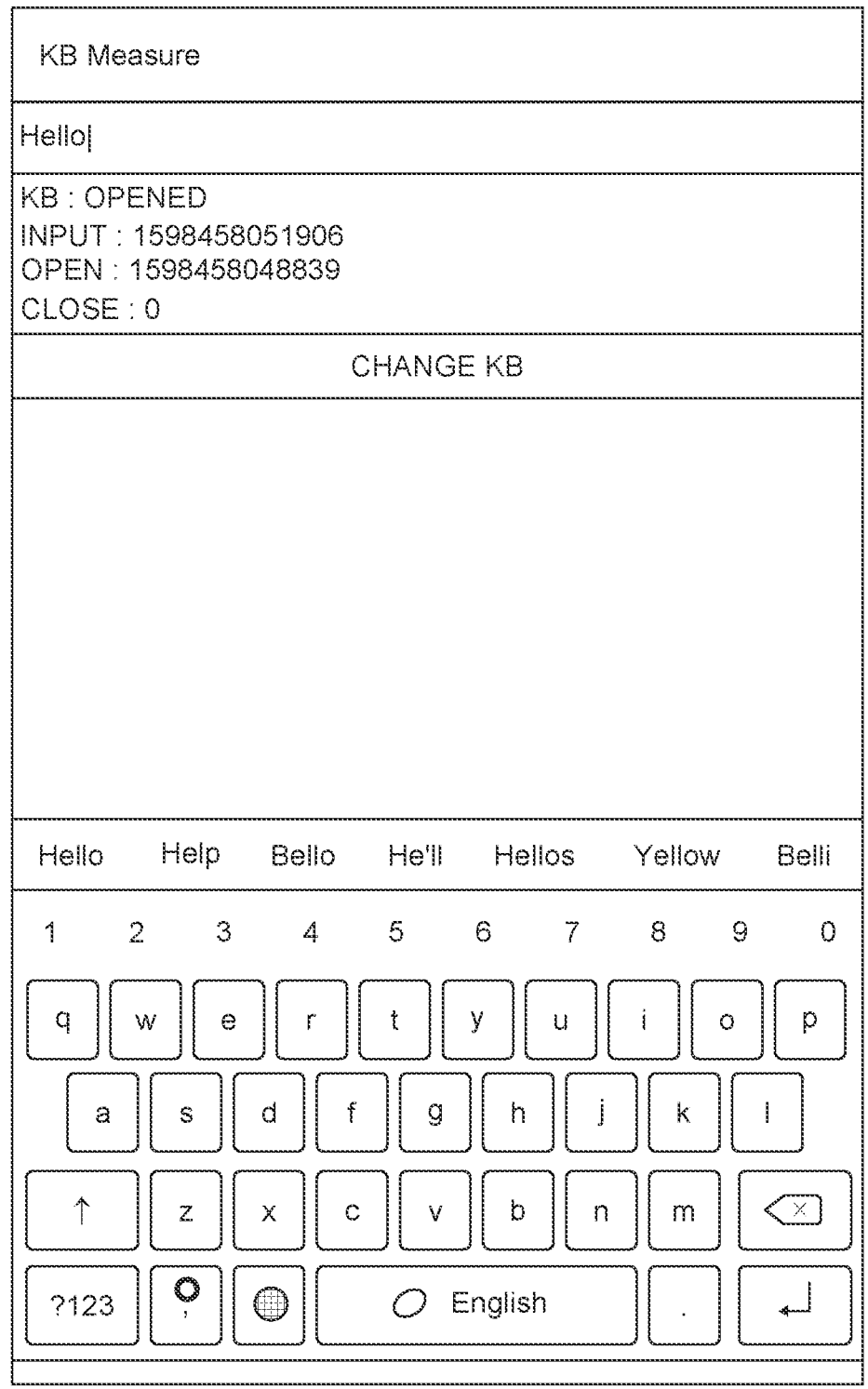
FIG. 10 is a schematic representation of an embodiment representing the corresponding keypad window of FIG. 1 in accordance with an embodiment of the present disclosure.

FIG. 10 is a schematic representation of an embodiment representing the corresponding keypad window 280 of FIG. 1 in accordance with an embodiment of the present disclosure. The touchscreen device 60 user may also track the automatic execution process of the character string (as stated above) from the keypad window 280.

FIG. 11a is a schematic exemplary embodiment of the system 10 to measure latency in displaying a key tap event corresponding to a touchscreen keyboard in accordance with an embodiment of the present disclosure. In such exemplary embodiment, a user Y 290 wants to check latency of a touchscreen X 60 with a GBoard keypad installed beforehand. First, the user Y 290 have to first register the touchscreen X 60 with the system 10 via a touchscreen device registration module. This registration process includes the installation of a testing app on the touchscreen device.

After registration, the user Y 290 must input character suing for upcoming latency test via a text input module 20. Here, in stated exemplary embodiment, the character string is "HELLO". The user Y 290 further have to select GBoard keypad via the keyboard selection module 30. Here, the GBoard keypad must be configured before usage.

A keyboard configuration module 40 enables real time configuration of the keypad, whereby the X-coordinate and Y-coordinate details of each character of "HELLO" is observed and stored. Here, one by one each character positional details are captured from pre-stored location details of the GBoard keypad stored data.

Figure 11:
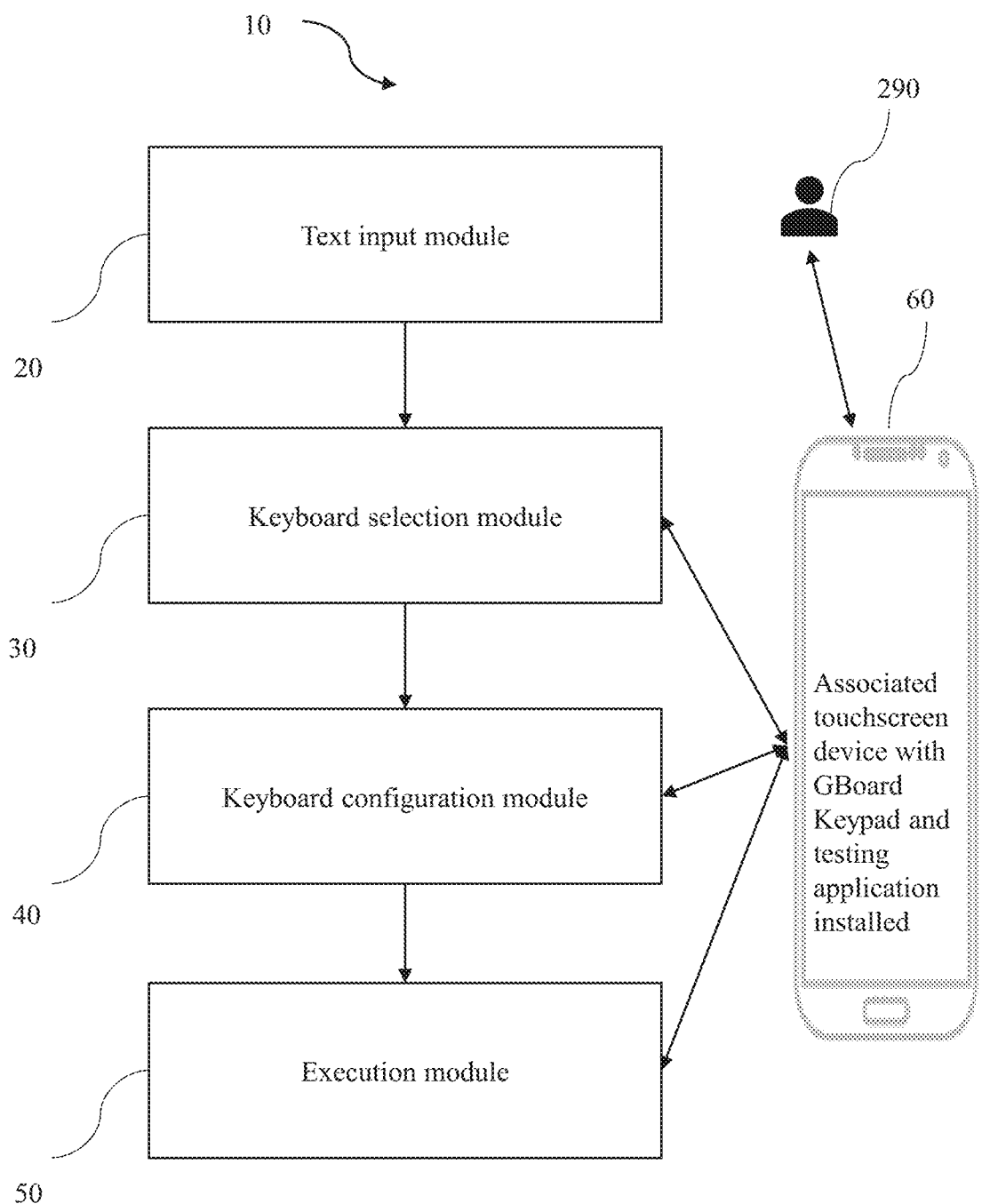
FIG. 11a is a schematic exemplary embodiment of the system to measure latency in displaying a key tap event corresponding to a touchscreen keyboard in accordance with an embodiment of the present disclosure.
FIG. 11b is a schematic exemplary embodiment of a screenshot of a test run of a word "HELLO" in accordance with an embodiment of the present disclosure.

After such configuration latency test is being conducted. An execution module 50 automatically identifies each character of the string "HELLO" and enters the character by a key tap event. Simultaneously, character tapped is displayed on the touchscreen device 60. The time lag between the key tap and key displayed is calculated for each character. For each character of "HELLO", time lag of every character is stored. Average of the time lag is measured to calculate total latency of the "HELLO" character string. The measured latency value is presented via the presentation module. FIG. 11b is a schematic exemplary embodiment of a screenshot of a test run of the word "HELLO" 282 in accordance with an embodiment of the present disclosure. The measured latency value 284 of the test run is 258 secs. Furthermore, the system 10 provides real time X-coordinate and Y-coordinate details 286 of each character of the word "HELLO", The text input module 20, the keyboard selection module 30, the keyboard configuration module 40 and the execution module 50 of FIG. 11 is similar to the text input module 20, the keyboard selection module 30, the keyboard configuration module 40 and the execution module 50 of FIG. 1.

Figure 12:
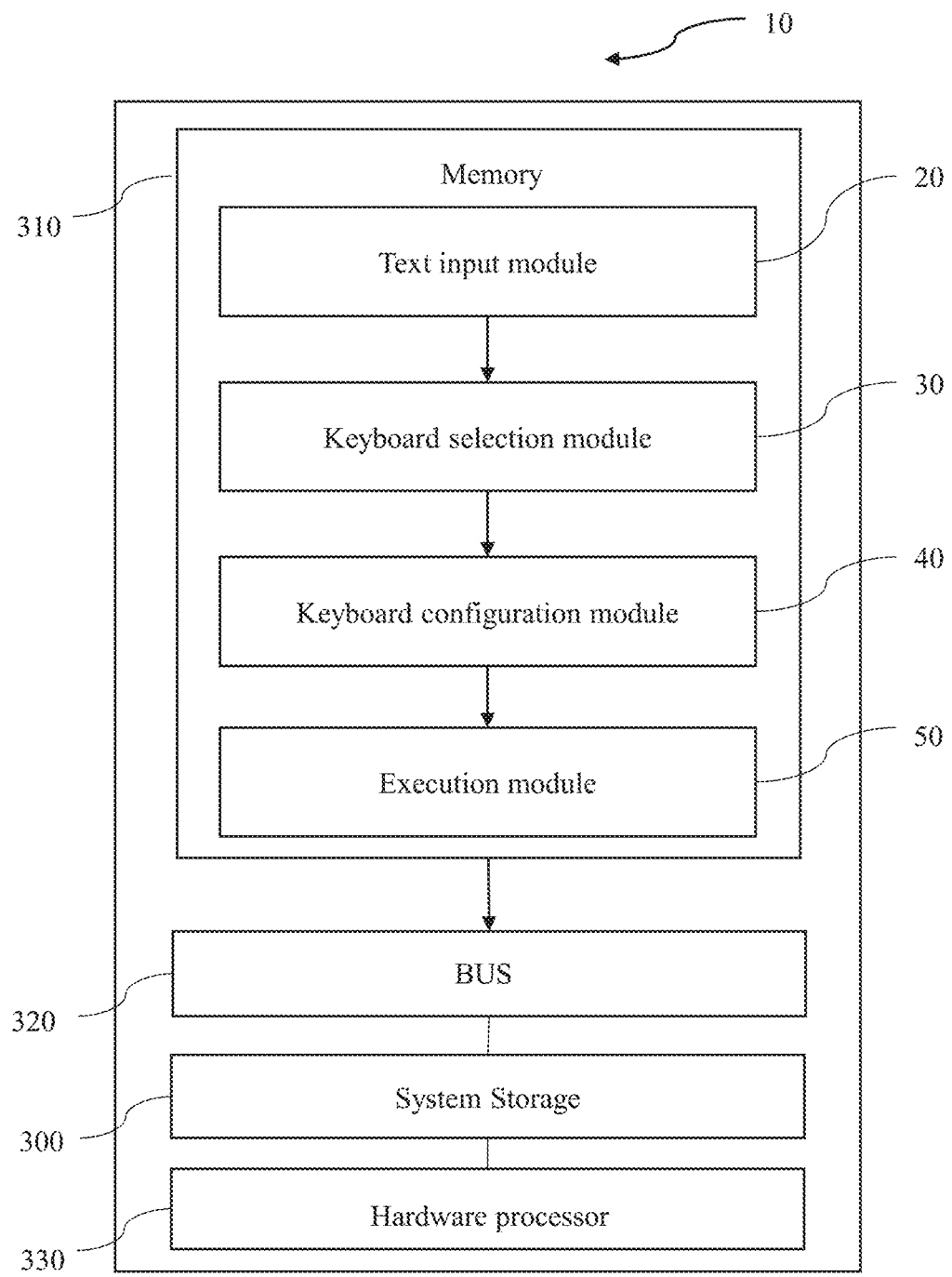
FIG. 12 is a block diagram illustrating components in a computer system in accordance with an embodiment of the present disclosure.

FIG. 12 is a block diagram illustrating components in a computer system 10 in accordance with an embodiment of the present disclosure. The computer system 10 includes a hardware processor(s) 330, a memory 310 coupled to the hardware processor(s) 330, a bus 320 and a system storage 300.

The hardware processor(s) 330, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 310 includes a plurality of modules stored in the form of executable program which instructs the hardware processor 330 via the bus 320 to perform the method steps illustrated in FIG. 1. The memory 310 has following modules: the text input module 20, the keyboard selection module 30, the keyboard configuration module 40 and the execution module 50.

The text input module 20 is configured to capture pre-defined text for latency measurement. The keyboard selection module 30 is configured to select a virtual keyboard for the latency measurement with respect to the pre-defined text.

The keyboard configuration module 40 is configured to capture positional details of each text character of the pre-defined text with respect to registered virtual keyboard, The execution module 50 is configured to execute the key tap event for each of the text character of the pre-defined text for latency measurement. The execution module 50 is also configured to measure time gap of each text character of the pre-defined text between the key tap event and corresponding text display event, The execution module 50 is also configured to calculate average latency measurement of the pre-defined text from a measured time gap for each of the character.

Computer memory elements may include any suitable memory device(s) for storing data and executable program, such as read only memory, random access memory, erasable programmable read only memory, electrically erasable programmable read only memory, hard drive, removable media drive for handling memory cards and the like, Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the hardware processor(s) 330.

Figure 13:
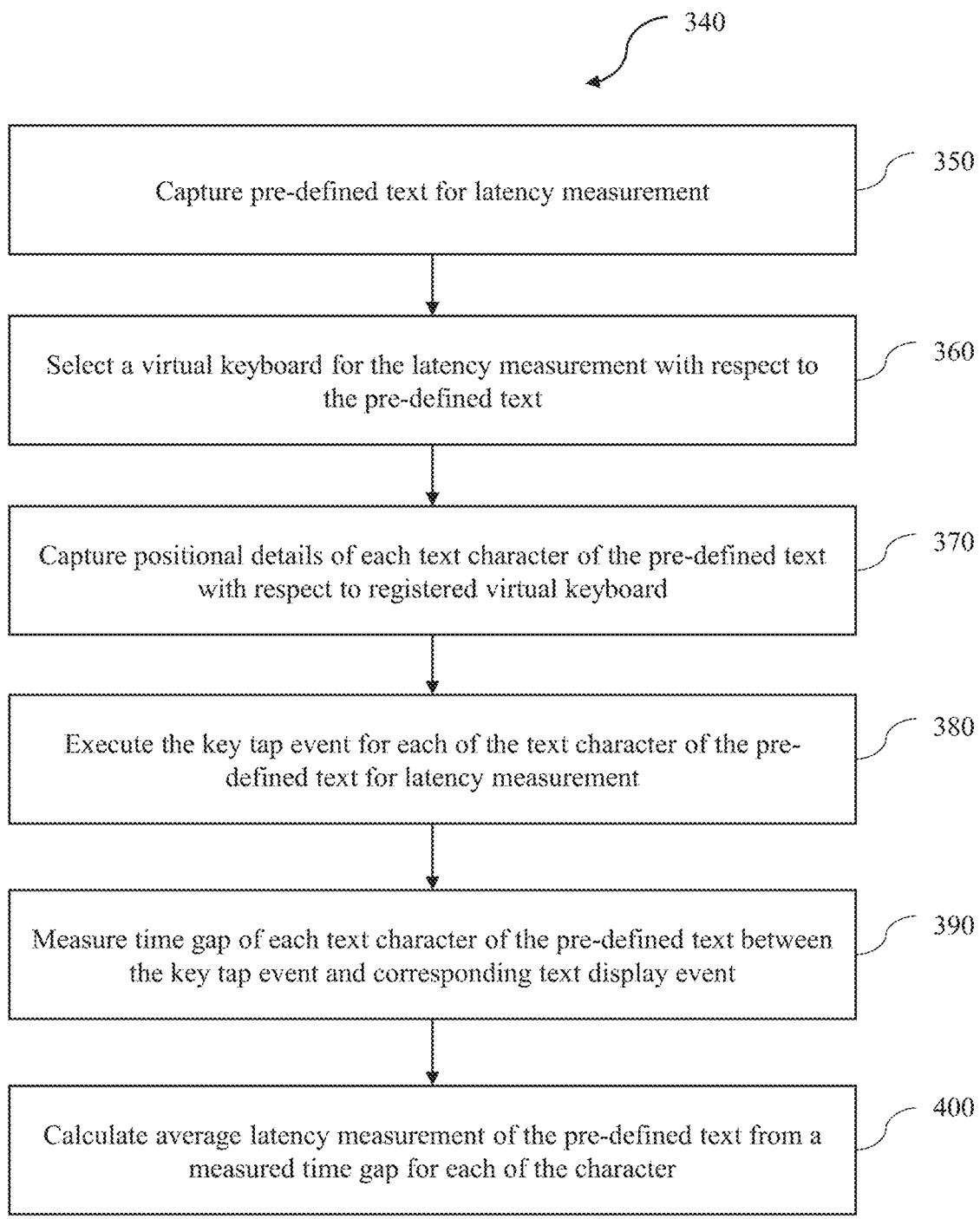
FIG. 13 is a flowchart representing the steps of a method for measuring latency in displaying a key tap event corresponding to a touchscreen keyboard in accordance with an embodiment of the present disclosure.

FIG. 13 is a flowchart representing the steps of a method 340 for measuring latency in displaying a key tap event corresponding to a touchscreen keyboard in accordance with an embodiment of the present disclosure. The method 340 includes capturing pre-defined text for latency measurement in step 350. In one embodiment, capturing the pre-defined text for latency measurement includes capturing the pre-defined text by a text input module. In another embodiment, capturing the pre-defined text for latency measurement includes capturing the pre-defined text comprising a manual input of text or uploading a text file.

The method 340 also includes selecting a virtual keyboard for the latency measurement with respect to the pre-defined text in step 360. In one embodiment, selecting the virtual keyboard for the latency measurement with respect to the pre-defined text includes selecting the virtual keyboard for the latency measurement with respect to the pre-defined text by a keyboard selection module.

The method 340 also capturing positional details of each text character of the pre-defined text with respect to registered virtual keyboard in step 370. In one embodiment, capturing the positional details of each text character of the pre-defined text with respect to the registered virtual keyboard includes capturing the positional details of each text character of the pre-defined text with respect to the registered virtual keyboard by a keyboard configuration module. In another embodiment, capturing the positional details of each text character of the pre-defined text with respect to the registered virtual keyboard includes capturing the positional details of each text character comprise X-coordinate location and Y-coordinate location.

The method 340 also includes executing the key tap event for each of the text character of the pre-defined text for latency measurement in step 380. In one embodiment, executing the key tap event for each of the text character of the pre-defined text for latency measurement includes executing the key tap event for each of the text character of the pre-defined text for latency measurement by an execution module. In another embodiment, executing the key tap event for each of the text character of the pre-defined text for latency measurement includes executing the key tap event corresponding to the pre-defined text comprises automatically processing with the registered virtual keyboard after configuration.

In yet another embodiment, executing the key tap event comprises automatically processing the key tap event includes identifying each character of the pre-defined text. In one embodiment, executing the key tap event comprises automatically processing the key tap event includes executing the key tapping event with respect to registered virtual keyboard for the identified character.

The method 340 also includes measuring time gap of each text character of the pre-defined text between the key tap event and corresponding text display event in step 390. In one embodiment, measuring the time gap of each text character of the pre-defined text between the key tap event and corresponding text display event includes measuring the time gap of each text character of the pre-defined text between the key tap event and corresponding text display event by the execution module.

The method 340 also includes calculating average latency measurement of the pre-defined text from a measured time gap for each of the character in step 400. In one embodiment, calculating the average latency measurement of the pre-defined text from the measured time gap for each of the character includes calculating the average latency measurement of the pre-defined text from the measured time gap for each of the character by the execution module.

The method 340 also includes registering one or more touchscreen devices for latency measurement. In one embodiment, registering the one or more touchscreen devices for latency measurement includes registering the one or more touchscreen devices for latency measurement by a touchscreen device registration module. In another embodiment, registering the one or more touchscreen devices for latency measurement includes registering the one or more touchscreen devices with configuration details are stored at in a system storage 300.

The method 340 also includes comprising presenting average latency measurement of the pre-defined text. In one embodiment, presenting the average latency measurement of the pre-defined text includes presenting the average latency measurement of the pre-defined text by a presentation module.

The method 340 also includes storing text character positional details with respect to registered virtual keyboard. In one embodiment, storing the text character positional details with respect to registered virtual keyboard includes storing the text character positional details with respect to registered virtual keyboard by a storage module.

Figure 14A:
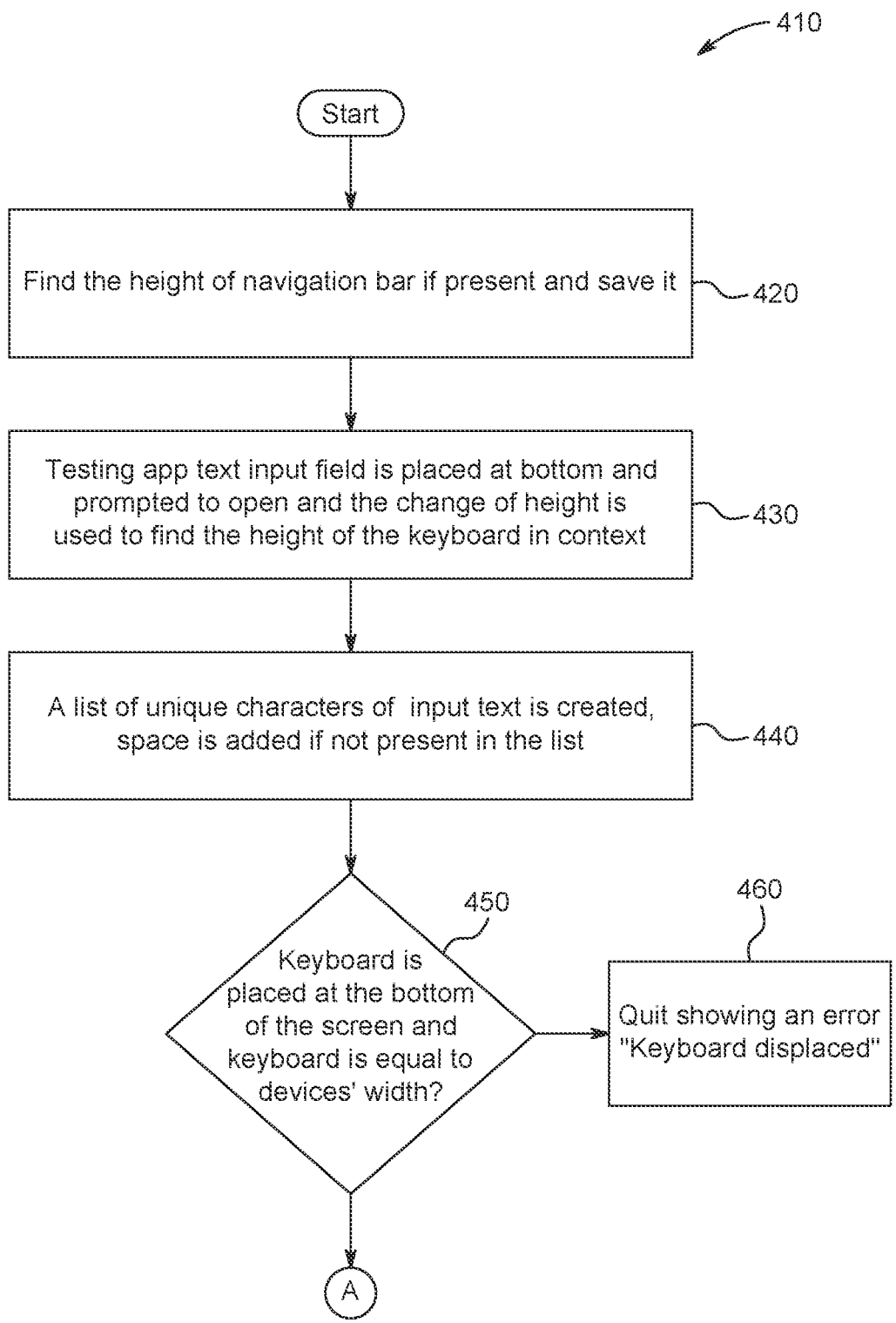
FIG. 14a, b and c is a flowchart representation of an embodiment representing the pre-determined steps employed to enable auto-configuration of the virtual keyboards in accordance with an embodiment of the present disclosure.
Figure 14B:
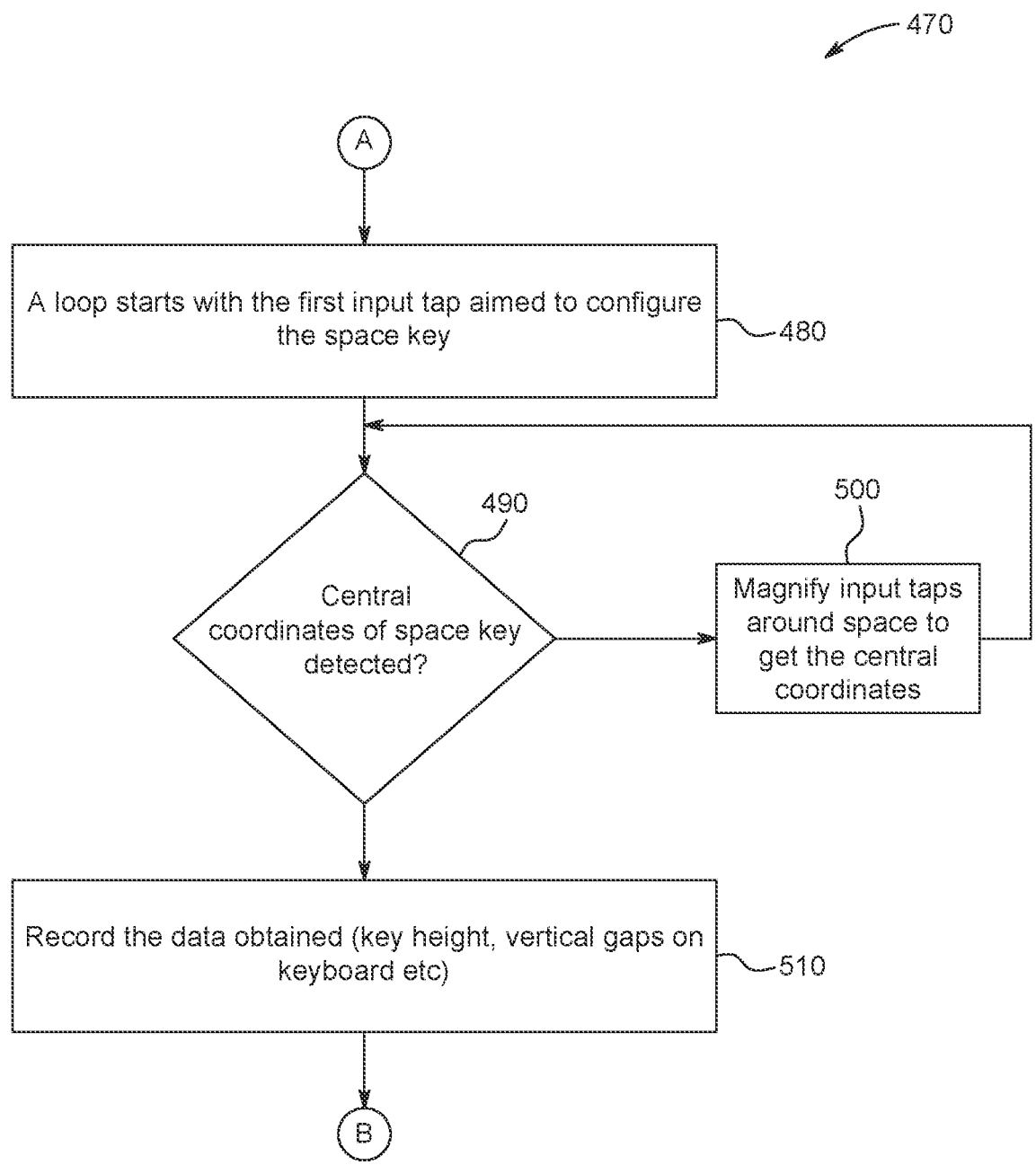
Figure 14:
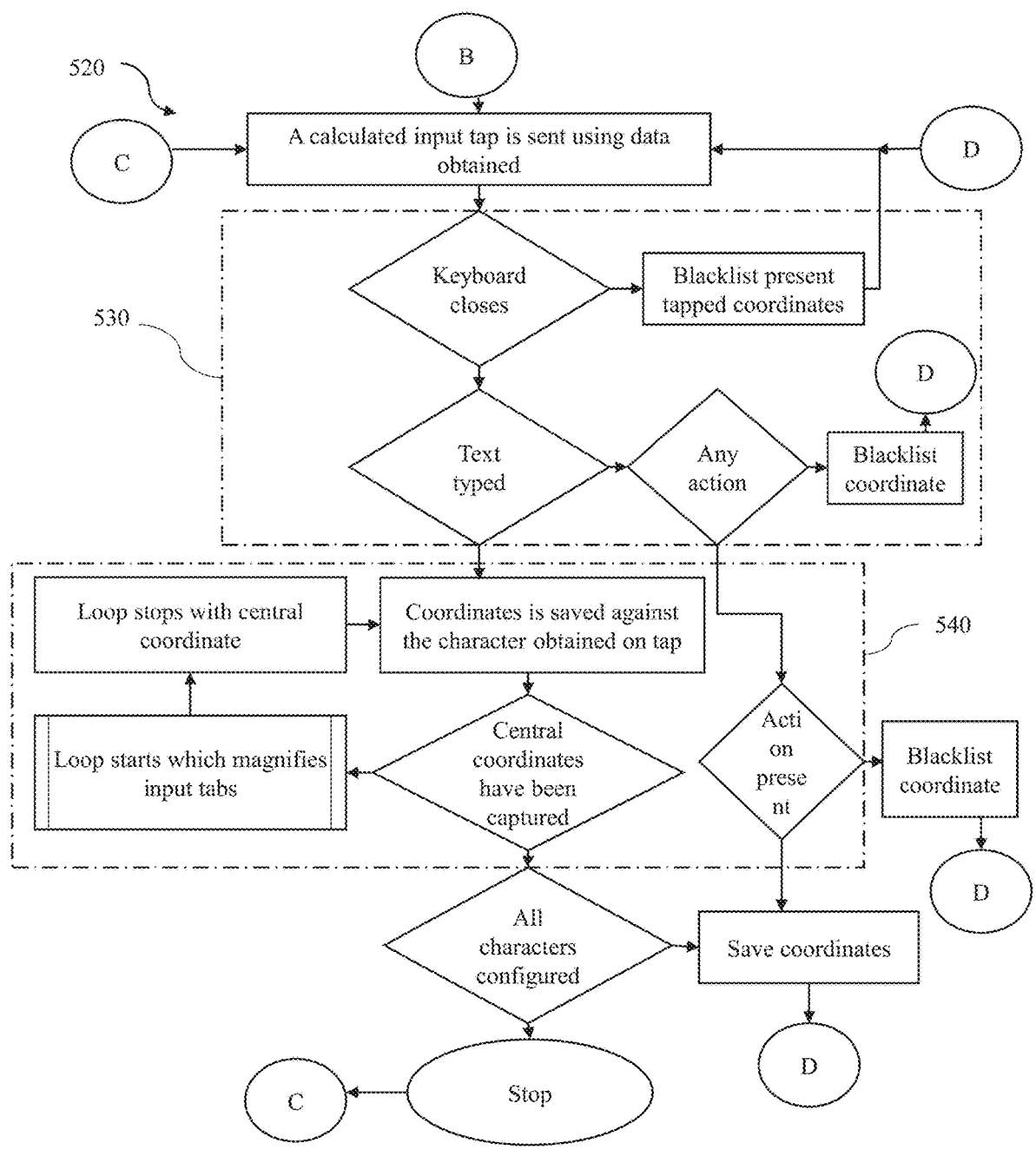

FIG. 14a, b and c is a flowchart representation of an embodiment representing the pre-determined steps employed to enable auto-configuration of the virtual keyboards 420, 470 and 520 in accordance with an embodiment of the present disclosure. For automating configuration process, the system 10 finds the height of navigation bar using android debug bridge in step 420. The text input box is placed on the bottom of the screen in step 430. In such embodiment, the change in height due to text input box placement gives us the height of keyboard. A list of unique characters of input text is created, space is added if not present in list in step 440. Placement of the keyboard at the bottom of the screen is checked and width is set to the devices' width in step 450. Furthermore, an error is prompted to the user and manual configuration method is advised on any problem in step 460.

A loop starts in step 480 which aims to stop when all the characters of the input text are configured. However, the characters are not limited to the characters inside the layout. The system 10 configures all the characters that may be find on the present or subsequent layouts since it uses a biased trial and error method to configure the keyboard. First iteration of the loop in step 490, begins with the intention of configure the space bar, once it is detected, a nested loop is employed to find its central positional details. Coordinates of first input tap is calculated based on studied keyboard layouts, detected size and location of the keyboard. The nested loop runs on first iteration to check if central coordinates of space key have been detected in step 500. This positional detail of the space bar acts as a pivot to move around the keyboard while configuring other characters. The data obtained (key height, vertical gaps on keyboard etc.) is recorded in step 510.

The system 10 in FIG. 14c applies biased trial and error method. The rectangular typing area of the virtual keyboard calculates input taps on the keyboard using android debug bridge. Any random tapping may generate three results, each of these results are handled differently as shown in step 530. In one embodiment, when an input tap closes the keyboard, the coordinates are blacklisted, and the keyboard is restarted for next input. In another embodiment, when there is no action on tap, the coordinate is saved in blacklisted list. No action on tap signifies that the keyboard remains open after tap. In yet another embodiment, when there is an action, the coordinates are saved as a CTA coordinates. The CTA coordinates are saved against known action (say CAPS LOCK, number/symbol screen, language change and the like). Unknown coordinates are saved but blacklisted. In such embodiment, the blacklisted coordinates indicate that input taps are avoided around them, Central coordinates of the character obtained on tap is saved in step 540, In one embodiment, when a text input is obtained on tap, the system 10 magnifies the input taps around the found coordinate to find the central coordinate of the key. Such process gives us the size or area of the key which is further used to estimate the number of rows present on the keyboard on current layout. In such embodiment, each input tap may generate three results. Central positional details of the character to be configured is captured. For configuring more characters, the loop is continued. If no more characters need to be configured, the loop is stopped.

In such embodiment, each iteration of the loop generates new random coordinates, which is dependent on the studied keyboard layouts, the size of the keyboard and other details gathered in earlier iterations. Gathered data in iterations are key height, key width, size of vertical gaps, size of horizontal gaps, detected location of keys, characters yet to configure and blacklisted coordinates.

Present disclosure of a system to measure latency in displaying a key tap event provides a benchmark facility for understanding the quality of a virtual keyboard. Here, the calculated latency time enable right combination of a virtual keyboard with a specific touchscreen device. The performance of the touchscreen device processor may also be judged accordingly by the time lag calculation.

While specific language has been used to describe the disclosure, any limitations arising on account of the same are not intended. As would be apparent to a person skilled in the art, various working modifications may be made to the method in order to implement the inventive concept as taught herein. It is pertinent to note that though the time lag is in milliseconds, but touchscreen device users do feel operational difficulties in low end phones.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A system to measure latency in displaying a key tap event corresponding to a touchscreen keyboard, the system comprises:
    a text input module operable by one or more processors and configured to capture pre-defined text for latency measurement, wherein the pre-defined text comprises one of a manual input of text or uploading a text file;
    a keyboard selection module operable by the one or more processors and operatively coupled to the text input module, wherein the keyboard selection module is configured to select a virtual keyboard for the latency measurement with respect to the pre-defined text;
    a keyboard configuration module operable by the one or more processors and operatively coupled to the keyboard selection module, wherein the keyboard configuration module is configured to capture positional details of each text character of the pre-defined text with respect to registered virtual keyboard, wherein the positional details comprise X-coordinate and Y-coordinate on the touchscreen; and
    an execution module operable by the one or more processors and operatively coupled to the keyboard configuration module, wherein the execution module is configured to:
        execute the key tap event for each of the text character of the pre-defined text for latency measurement, wherein the key tap event corresponding to the pre-defined text is automatically processed with the registered virtual keyboard after configuration;

measure time gap of each text character of the pre-defined text between the key tap event and corresponding text display event; and calculate average latency measurement of the pre-defined text from a measured time gap for each text character of the pre-defined text.

2. The system as claimed in claim 1, comprising a touchscreen device registration module operable by the one or more processors, wherein the touchscreen device registration module is configured to register one or more touchscreen devices for latency measurement, wherein for registration of each of the one or more touchscreen devices configuration details are stored at a system storage.

3. The system as claimed in claim 1, comprising a presentation module operable by the one or more processors and operatively coupled to the execution module, wherein the presentation module is configured to present average latency measurement of the pre-defined text.

4. The system as claimed in claim 1, wherein for automatically processing the key tap event corresponding to the pre-defined text, the execution module is configured to:
identify each character of the pre-defined text; and
execute key tapping event with respect to registered virtual keyboard for the identified character.

5. The system as claimed in claim 1, comprising a storage module operable by the one or more processors and operatively coupled to the keyboard configuration module, wherein the storage module is configured to store text character positional details with respect to registered virtual keyboard.

6. The system as claimed in claim 1, wherein the keyboard configuration module is also configured to enable auto-configuration of the virtual keyboards by a set of pre-determined steps.

7. A method for measuring latency in displaying a key tap event corresponding to a touchscreen keyboard, the method comprising:
capturing, by a text input module, pre-defined text for latency measurement;
selecting, by a keyboard selection module, a virtual keyboard for the latency measurement with respect to the pre-defined text;
capturing, by a keyboard configuration module, positional details of each text character of the pre-defined text with respect to registered virtual keyboard;

executing, by an execution module, the key tap event for each of the text character of the pre-defined text for latency measurement;
measuring, by the execution module, time gap of each text character of the pre-defined text between the key tap event and corresponding text display event; and
calculating, by the execution nodule, average latency measurement of the pre-defined text from a measured time gap for the each text character of the pre-defined text.

8. The method as claimed in claim 7, wherein capturing, by the text input module, the pre-defined text comprising a manual input of text or uploading a text file.

9. The method as claimed in claim 7, wherein capturing, by a keyboard configuration module, positional details of each text character comprise X-coordinate location and Y-coordinate location.

10. The method as claimed in claim 7, wherein executing, by an execution module, the key tap event corresponding to the pre-defined text comprises automatically processing with the registered virtual keyboard after configuration.

11. The method as claimed in claim 7, comprising registering, by a touchscreen device registration module, one or more touchscreen devices for latency measurement.

12. The method as claimed in claim 11, wherein registering, by the touchscreen device registration module, the one or more touchscreen devices with configuration details are stored at in a system storage.

13. The method as claimed in claim 7, comprising presenting, by a presentation module, average latency measurement of the pre-defined text.

14. The method as claimed in claim 7, wherein executing, by an execution module, the key tap event comprises automatically processing the key tap event comprising:
identifying each character of the pre-defined text; and
executing key tapping event with respect to registered virtual keyboard for the identified character.

15. The method as claimed in claim 7, comprising storing, by a storage module, text character positional details with respect to registered virtual keyboard.

16. The method as claimed in claim 7, wherein enabling, by the keyboard configuration module 40, auto-configuration of the virtual keyboards by a set of pre-determined steps.

* * * * *